(12) United States Patent
Williams et al.

(10) Patent No.: US 11,987,207 B2
(45) Date of Patent: May 21, 2024

(54) VEHICLES AND VEHICLE SYSTEMS FOR OPERATING POWERED RUNNING BOARDS IN AN ALARM DETERRENT MODE

(71) Applicant: Toyota Motor Engineering & Manufacturing North America, Inc., Plano, TX (US)

(72) Inventors: Clinton Williams, Saline, MI (US); Alexander L. Paradis, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 332 days.

(21) Appl. No.: 17/494,395

(22) Filed: Oct. 5, 2021

(65) Prior Publication Data
US 2023/0103458 A1    Apr. 6, 2023

(51) Int. Cl.
| | |
|---|---|
| *B60R 25/01* | (2013.01) |
| *B60R 3/00* | (2006.01) |
| *B60R 25/104* | (2013.01) |
| *B60R 25/30* | (2013.01) |
| *B60R 25/31* | (2013.01) |

(52) U.S. Cl.
CPC .............. *B60R 25/01* (2013.01); *B60R 3/002* (2013.01); *B60R 25/104* (2013.01); *B60R 25/305* (2013.01); *B60R 25/31* (2013.01)

(58) Field of Classification Search
CPC ...................................................... B60R 25/01
See application file for complete search history.

(56) References Cited

U.S. PATENT DOCUMENTS

| | | | |
|---|---|---|---|
| 3,781,789 A | 12/1973 | Caleskie et al. | |
| 4,842,093 A | 6/1989 | Lerche et al. | |
| 5,334,969 A | 8/1994 | Abe et al. | |
| 6,325,397 B1 | 12/2001 | Pascoe et al. | |
| 9,272,667 B2 * | 3/2016 | Smith | B60R 3/02 |
| 9,975,490 B1 | 5/2018 | Ozog et al. | |
| 10,220,704 B2 * | 3/2019 | Machak | G05B 19/048 |

(Continued)

FOREIGN PATENT DOCUMENTS

| | | |
|---|---|---|
| CN | 202215074 U | 5/2012 |
| EP | 3524475 A1 | 8/2019 |
| JP | 07081531 A | 3/1995 |

OTHER PUBLICATIONS

Sentry Mode: Guarding Your Tesla (https://www.tesla.com/blog/sentry-modeguarding-your-tesla), published Feb. 13. 2019, 2 pages.

(Continued)

*Primary Examiner* — Michael A Berns
(74) *Attorney, Agent, or Firm* — Dinsmore & Shohl LLP

(57) ABSTRACT

A vehicle including a powered running board, a motor for positioning the powered running board between a stowed position and a deployed position, a sensor configured to capture data of activity around the vehicle, and an electronic control unit configured to process the data captured by the sensor to detect an unauthorized event around the vehicle, and operate the motor to repeatedly move the powered running board in a predetermined pattern based on at least one of position and a speed in response to the sensor detecting an unauthorized event around the vehicle.

20 Claims, 5 Drawing Sheets

(56) References Cited

U.S. PATENT DOCUMENTS

| | | | |
|---|---|---|---|
| 10,336,260 B1 * | 7/2019 | Salter | B60R 3/02 |
| 10,399,500 B2 * | 9/2019 | Hayes | B60R 3/02 |
| 11,198,395 B2 * | 12/2021 | Smith | G05D 3/10 |
| 11,299,099 B2 * | 4/2022 | Berger | B60R 3/02 |
| 11,458,900 B2 * | 10/2022 | Watson | B60R 3/002 |
| 2005/0151340 A1 | 7/2005 | Leitner | |
| 2005/0248444 A1 | 11/2005 | Joao | |
| 2016/0001317 A1 | 1/2016 | Sasaki et al. | |
| 2020/0361390 A1 | 11/2020 | Stickles et al. | |
| 2023/0103458 A1 * | 4/2023 | Williams | B60R 25/305 701/49 |

OTHER PUBLICATIONS

A practical design of anti-theft car protection system based on microcontroller (https://www.researchgate.net/publication/321128544_A_Practical_Design_of_Anti-Theft_Car_Protection_System_Based_on_Microcontroller), published Jan. 1, 2021, 9 pages.

* cited by examiner

US 11,987,207 B2

VEHICLES AND VEHICLE SYSTEMS FOR OPERATING POWERED RUNNING BOARDS IN AN ALARM DETERRENT MODE

TECHNICAL FIELD

The present specification generally relates to vehicle alarm systems for deterring theft activity and, more specifically, powered running boards configured to move in a predetermined pattern to deter detected theft activity around a vehicle.

BACKGROUND

Vehicle alarm systems may be configured to detect theft activity and initiate an alarm routine such as, for example, activating a horn and lights of the vehicle to alert others of the detected theft activity. However, these vehicle alarm systems do not operate in a first mode configured to provide a first set of alarm actions when a first level of theft activity is detected and subsequently operate in a second mode configured to provide a different second set of alarm actions when a second level of theft activity is detected. Furthermore, these vehicle alarm systems are restricted to operating only certain vehicle components in a limited manner.

Accordingly, a need exists for improved vehicle alarm systems that can operate in an initial deterrent mode based on the level of theft activity detected and control a wide variety of vehicle components in a unique manner directed at deterring the theft activity.

SUMMARY

In one embodiment, a vehicle includes a powered running board, a motor for positioning the powered running board between a stowed position and a deployed position, a sensor configured to capture data of activity around the vehicle, and an electronic control unit configured to process the data captured by the sensor to detect an unauthorized event around the vehicle, and operate the motor to repeatedly move the powered running board in a predetermined pattern based on at least one of position and a speed in response to one or more sensors detecting an unauthorized event around the vehicle.

In another embodiment, an electronic control unit of a vehicle is configured to process data captured by a sensor to detect an unauthorized event around the vehicle, and operate a motor of the vehicle to repeatedly move a powered running board of the vehicle in a predetermined pattern based on at least one of position and speed in response to detecting the unauthorized event around the vehicle.

In yet another embodiment, a method includes detecting an unauthorized event around a vehicle, and in response to detecting the unauthorized event around the vehicle, operating a motor to repeatedly move a powered running board in a predetermined pattern based on at least one of position and a speed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
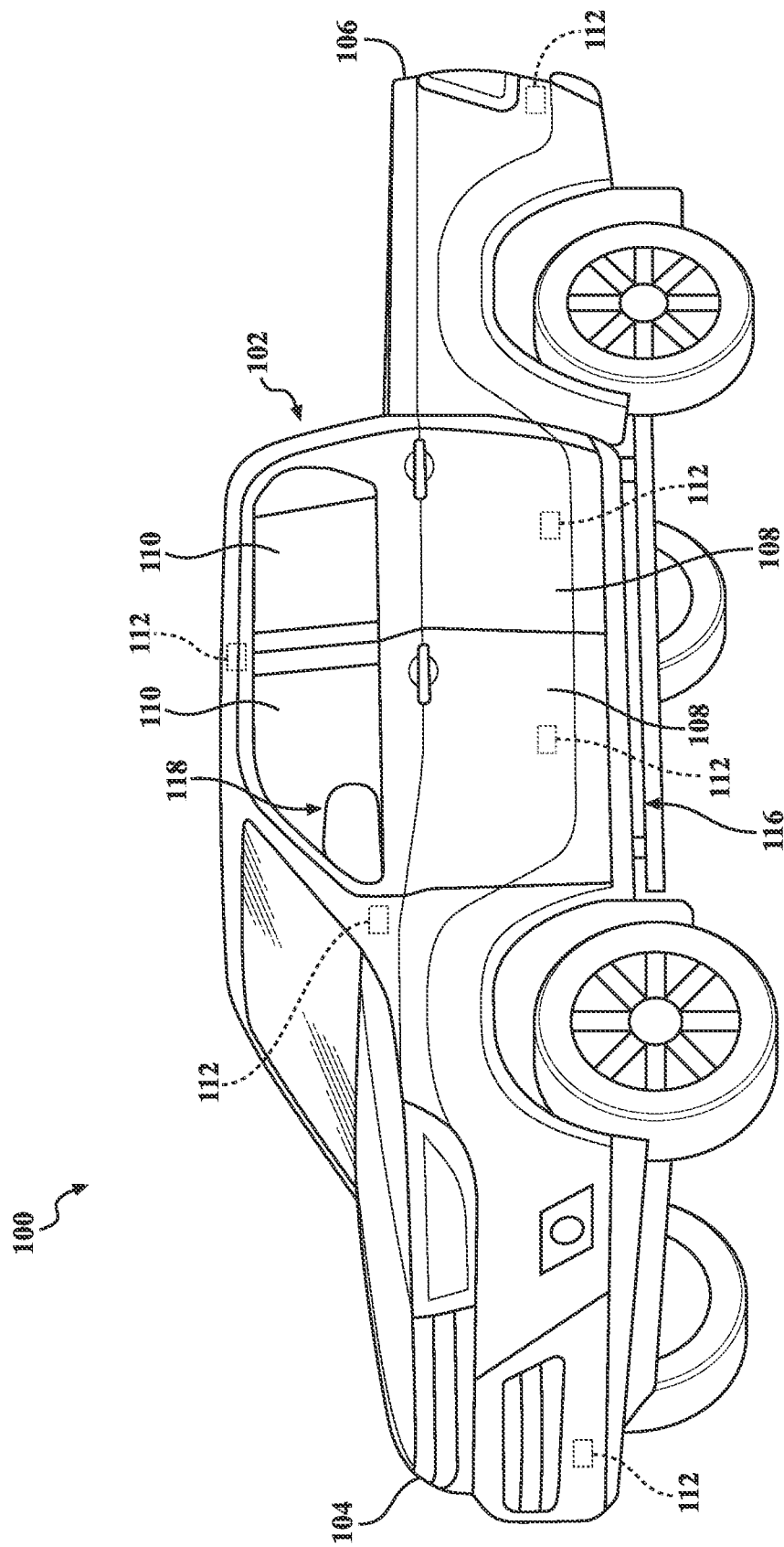
FIG. 1 schematically depicts a perspective view of a vehicle, according to one or more embodiments shown and described herein.

Embodiments described herein are directed to vehicles and vehicle systems including an alarm device configured to operate in either a deterrent mode or a normal mode based on a level of an unauthorized event detected around the vehicle.

The vehicle includes a vehicle component such as, for example, a powered running board or a powered side mirror, a motor for positioning the vehicle component between a stowed position and a deployed position, one or more sensors for detecting an unauthorized event around the vehicle, and a controller configured to operate the motor to repeatedly move the vehicle component in a predetermined pattern based on at least one of position and a speed in response to the one or more sensors detecting an unauthorized event around the vehicle. Various embodiments of the vehicle and the operation of the vehicle are described in more detail herein. Whenever possible, the same reference numerals will be used throughout the drawings to refer to the same or like parts.

Referring now to FIG. 1, a vehicle 100 is illustrated according to one or more embodiments described herein. The vehicle 100 may generally include a vehicle body 102 having a front end 104 and an opposite rear end 106, one or more doors 108, and one or more windows 110. As the vehicle 100 illustrated in FIG. 1 and discussed herein is depicted as a pickup truck, it should be appreciated that the vehicle 100 may be any suitable vehicle such as, for example, a sedan, van, and the like.

In embodiments, the vehicle 100 includes one or more sensors 112 for capturing data of activity around the vehicle 100, such as audio and/or visual data, utilized to detect an unauthorized event around the vehicle 100, as described in more detail herein. As shown in FIG. 1, a plurality of sensors 112 are provided on the vehicle 100. In embodiments, the sensors 112 may be provided at the front end 104 of the vehicle body 102, the rear end 106 of the vehicle body 102, on one of the doors 108 of the vehicle 100, and/or any other suitable location of the vehicle 100. The sensors 112 may include one or more cameras, such as a front camera, rear camera, right side camera, left side camera, interior camera, exterior camera, driver monitor camera, trailer camera, bed camera, blind spot camera, and the like, intrusion sensor, temperature sensors, proximity sensors, pressure sensors, photoelectric sensors, particle sensors, motion sensors, tilt sensors, infrared sensors, ultrasonic sensors, light sensors, sonar sensors, and the like, or a combination thereof.

As discussed in more detail herein, the sensors 112 are configured to detect the unauthorized event exterior of the vehicle 100. As referred to herein, "unauthorized event" may refer to, for example, contact with the vehicle body 102, a person entering within a predetermined proximity of the vehicle 100, a person standing within a predetermined proximity of the vehicle 100 in excess of a predetermined period of time, a person peering through the windows 110 of the vehicle 100, a person reaching through a window 110 or a bed of the vehicle 100, attempting to open a door 108 of the vehicle 100, and the like.

The sensors 112 may also be configured to distinguish between two or more levels of an unauthorized event such as, for example, a first level unauthorized event and a second unauthorized event. The first level unauthorized event may be satisfied when certain activity is detected by the sensors 112 such as, but not limited to, the specific examples discussed herein. The second level unauthorized event may be satisfied when more severe activity is detected such as, for example, breaking of a window 110 of the vehicle 100, or when it is determined that the first level unauthorized event is detected for a period of time exceeding a predetermined period of time. As discussed in more detail herein, the first level unauthorized activity may cause an alarm device 114 (FIG. 4) of the vehicle 100 to operate in a deterrent mode, while the second level unauthorized activity may cause the alarm device 114 of the vehicle 100 to operate in a normal mode.

In embodiments, the vehicle 100 includes a powered running board 116 for assisting a passenger in entering and exiting the vehicle 100. Particularly, the powered running board 116 is positionable between a stowed position, as shown in FIG. 1, in which the powered running board 116 is retracted toward the vehicle body 102, and a deployed position, as shown in solid lines in FIG. 2, in which the powered running board 116 is extended from the vehicle body 102. The powered running board 116 may be positionable between the stowed position and the deployed position in response to operation of one of the doors 108 of the vehicle 100. For example, in response to determining that one of the doors 108 of the vehicle 100 are opened, the powered running board 116 may be positioned into the deployed position such that an occupant of the vehicle 100 may step onto the powered running board 116 to facilitate entering and/or exiting of the vehicle 100. In response to detecting that the door 108 is closed, the powered running board 116 may be positioned into the stowed position as no occupant is currently entering or exiting the vehicle 100 with the door 108 closed. As discussed in more detail herein, the powered running board 116 may be operated in response to the alarm device 114 of the vehicle 100 operating in the deterrent mode and, in some embodiments, in the normal mode as well.

In embodiments, the vehicle 100 may include one or more side mirrors 118 provided closer to the front end 104 of the vehicle body 102 than to the rear end 106 of the vehicle body 102. As only one side mirror 118 is illustrated in FIG. 1, it should be appreciated that a second side mirror is provided on an opposite side of the vehicle 100. As such, reference to operation of the side mirror 118 is equally applicable to the other side mirror. The powered side mirror 118 is positionable between a stowed position, in which the powered side mirror 118 is retracted toward the vehicle body 102, and a deployed position, in which the powered side mirror 118 is extended from the vehicle body 102. The powered side mirror 118 may be positionable between the stowed position and the deployed position in response to operation of the vehicle 100 such as, for example, starting or stopping of an engine, motor, or battery of the vehicle 100. More particularly, as a non-limiting example, in response to receiving or detecting a vehicle start command such as, for example, starting of the engine, motor, or battery of the vehicle 100, the powered side mirror 118 may be positioned into the deployed position. As another non-limiting example, in response to receiving or detecting a vehicle stop command such as, for example, stopping of the engine, motor, or battery of the vehicle 100, the powered side mirror 118 may be positioned into the stowed position. As discussed in more detail herein, the powered side mirror 118 may be operated in response to the alarm device 114 of the vehicle 100 operating in the deterrent mode and, in some embodiments, in the normal mode as well.

Figure 2:
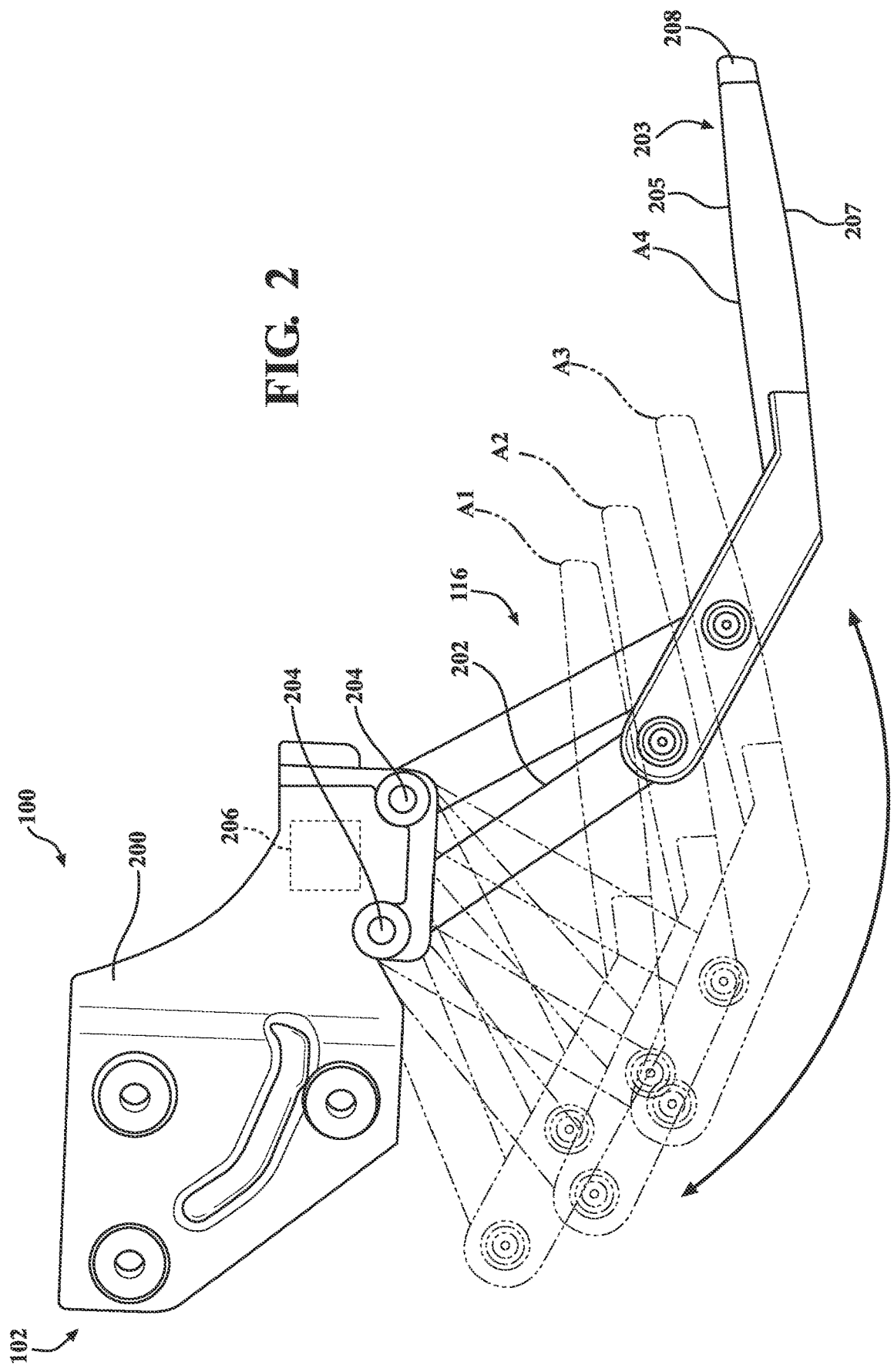
FIG. 2 schematically depicts a side view of a powered running board of the vehicle of FIG. 1 in a plurality of positions, according to one or more embodiments shown and described herein.

Referring now to FIG. 2, the powered running board 116 is shown extending from the vehicle body 102 of the vehicle 100, particularly a rocker 200 of the vehicle 100. Specifically, the powered running board 116 is shown positioned in the stowed position A1 and the deployed position A4. The powered running board 116 is pivotally attached to the rocker 200 at one or more pivots points by respective linkage members 202. As shown, the powered running board 116 is pivotally attached to the rocker 200 at a pair of pivots 204 by a pair of linkage members 202. The powered running board 116 includes a foot portion 203 coupled to the linkage members 202 at an end thereof opposite the rocker 200. The foot portion 203 has an upper surface 205 and an opposite lower surface 207. A motor 206 is provided for positioning the powered running board 116 between the stowed position A1 and the deployed position A4. It should be appreciated that, when the powered running board 116 is in the stowed position A1, a person is inhibited from placing their foot on the upper surface 205 of the powered running board 116 to assist in entering or exiting the vehicle 100. Alternatively, when the powered running board 116 is in the deployed position A4, a person is permitted to place their foot on the powered running board 116 to assist in entering or exiting the vehicle 100. In embodiments, the motor 206 may position the powered running board 116 at a first intermediate position A2 and a second intermediate position A3 between the stowed position A1 and the deployed position A4. As discussed in more detail herein, the motor 206 may be configured to move the powered running board 116 in a predetermined pattern based on at least one of position and a speed in response to the one or more sensors 112 detecting an unauthorized event around the vehicle 100.

For example, the predetermined pattern, when based on position, may include the powered running board 116 incrementally moving toward the deployed position A4 the longer the unauthorized event is detected or within a predetermined proximity of the vehicle 100. Specifically, the powered running board 116 may initially move to the first intermediate position A2 from the stowed position A1 for a first predetermined period of time, subsequently move to the second intermediate position A3 from the first intermediate position A2 for a second predetermined period of time, and subsequently move to the deployed position A4 for a third predetermined period of time. In embodiments, the powered running board 116 may remain in the deployed position A4 until it is determined that the unauthorized event is no longer detected or within the predetermined proximity of the vehicle 100.

As another example, the predetermined pattern, when based on position, may include the powered running board 116 incrementally moving toward the stowed position A1 the longer the unauthorized event is detected or within a predetermined proximity of the vehicle 100. Specifically, the powered running board 116 may initially move to the second intermediate position A3 from the deployed position A4 for a first predetermined period of time, subsequently move to the first intermediate position A2 from the second intermediate position A3 for a second predetermined period of time, and subsequently move to the stowed position A1 for a third predetermined period of time. In embodiments, the powered running board 116 may remain in the stowed position A1 until it is determined that the unauthorized event is no longer detected or within the predetermined proximity of the vehicle 100.

As another example, the predetermined pattern, when based on position, may include the powered running board 116 moving toward the deployed position relative to a detected distance from an object detected within the unauthorized event, e.g., an unauthorized person approaching the vehicle 100. Specifically, the powered running board 116 may initially move to the first intermediate position A2 from the stowed position A1 when the unauthorized person is within a first predetermined distance of the vehicle 100, subsequently move to the second intermediate position A3 from the first intermediate position A2 when the unauthorized person is within a second predetermined distance of the vehicle 100 less than the first predetermined distance, and subsequently move to the deployed position A4 when the unauthorized person is within a third predetermined distance of the vehicle 100 less than the second predetermined distance. In embodiments, the powered running board 116 may move in the reverse order as the distance between the unauthorized person and the vehicle 100 increases, e.g., when the unauthorized person moves away from the vehicle 100.

As another example, the predetermined pattern, when based on position, may include the powered running board 116 repeatedly moving between two positions, such as the first intermediate position A2 and the second intermediate position A3. The provides a "shake" or "vibrate" effect across a reduced range of motion of the powered running board 116 as compared to the range of motion provided between the stowed position A1 and the deployed position A4.

As another example, the predetermined pattern, when based on position, may include the powered running board 116 moving in a "stairstepper" pattern. As referred to herein, the "stairstepper" pattern refers to the powered running board 116 alternating between moving in a direction toward the deployed position A4 and in a direction toward the stowed position A1, but eventually reaching the deployed position A4. For example, the powered running board 116 may move to the first intermediate position A2, back to the stowed position A1, to the second intermediate position A3, back to the first intermediate position A2, and finally to the deployed position A4. Alternatively, the powered running board 116 may move in the reverse direction to eventually reach the stowed position A1.

As another example, the predetermined pattern, when based on speed, may include the powered running board 116 moving into the stowed position A1 from the deployed position A4 at a first speed, and back into the deployed position A4 from the stowed position A1 at a second speed different from the first speed. In embodiments, the second speed is greater than the first speed. In other embodiments, the second speed is less than the first speed.

As another example, the predetermined pattern, when based on speed, may include the powered running board 116 moving between the stowed position A1 and the deployed position A4 a predetermined number of times at a first speed and, subsequently, a predetermined number of times at a second speed. In embodiments, the second speed is greater than the first speed. In other embodiments, the second speed is less than the first speed. It should be appreciated that, in embodiments, the first speed and the second speed, and/or the predetermined number of times the powered running board 116 moves at the first speed and the second speed, may be dependent on the particular conditions of the unauthorized event. Specifically, as a non-limiting example, the speed at which the powered running board 116 moves between the stowed position A1 and the deployed position A4 may increase in response to a distance between the vehicle 100 and an object of the unauthorized event decreasing.

In embodiments, the powered running board 116 includes one or more lighting elements 208. As shown, the lighting element 208 is provided on an end of the powered running board 116 opposite the rocker 200. However, the lighting element 208 may be provided at any suitable location of the powered running board 116. In embodiments, the lighting element 208 may be configured to be illuminated in a predetermined pattern as well.

For example, the predetermined pattern may include a flash rate of the lighting element 208 that increases the longer the unauthorized event is detected. Specifically, the lighting element 208 may flash at a first speed for a first predetermined period of time, and a second speed greater than the first speed for a second predetermined period of time. Alternatively, the predetermined pattern may include a flash rate of the lighting element 208 that decreases the longer the unauthorized event is detected. Specifically, the lighting element 208 may flash at a first speed for a first predetermined period of time, and a second speed less than the first speed for a second predetermined period of time.

As another example, the predetermined pattern may include a flash rate of the lighting element 208 that increases relative to a detected distance from an object detected within the unauthorized event, e.g., an unauthorized person approaching the vehicle 100. Specifically, the flash rate may be a first rate when the unauthorized person is within a first predetermined distance of the vehicle 100, a second rate greater than the first rate when the unauthorized person is within a second predetermined distance of the vehicle 100 less than the first predetermined distance, and a third rate greater than the second rate when the unauthorized person is within a third predetermined distance of the vehicle 100 less than the second predetermined distance.

As another example, the predetermined pattern may include the flash rate of the lighting element 208 alternating between a first rate for a first predetermined period of time, and a second rate greater than the first rate for a second predetermined period of time.

It should be appreciated that the examples of the predetermined pattern for which the powered running board 116 moves and the speed at which the powered running board 116 moves, as well as the rate at which the lighting element 208 is illuminated, is not limited to the specific examples provided herein. As such, other examples not discussed in detail herein are contemplated as being within the scope of the present disclosure.

Figure 3:
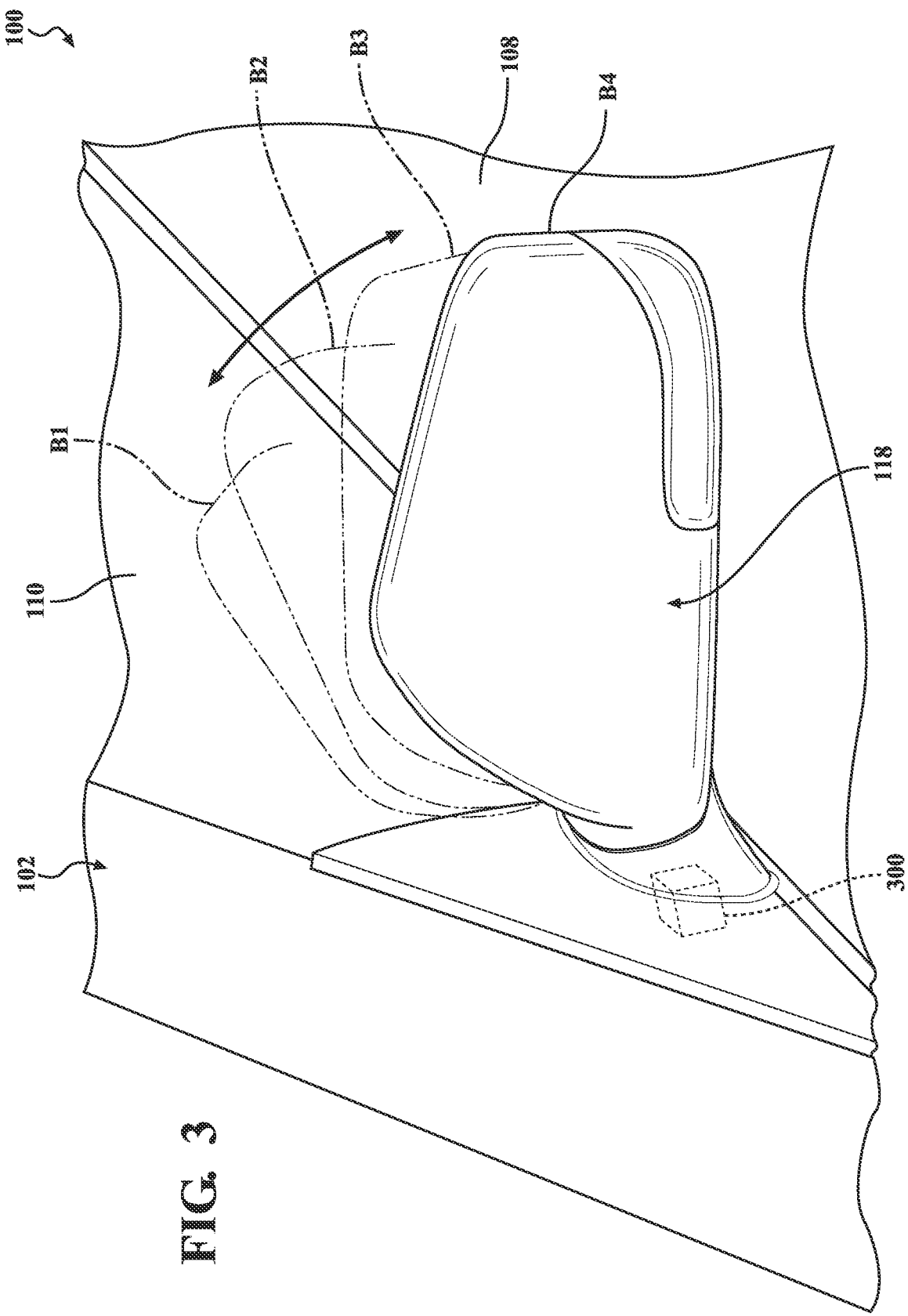
FIG. 3 schematically depicts a perspective view of a powered side mirror of the vehicle of FIG. 1 in a plurality of positions, according to one or more embodiments shown and described herein.

Referring now to FIG. 3, the powered side mirror 118 is shown extending from the vehicle body 102 of the vehicle 100. Specifically, the powered side mirror 118 is shown positioned in a stowed position B1 and a deployed position B4. The powered side mirror 118 is pivotally attached to the vehicle body 102. A motor 300 is provided for positioning the powered side mirror 118 between the stowed position B1 and the deployed position B4. In embodiments, the motor 300 may position the powered side mirror 118 at a first intermediate position B2 and a second intermediate position B3 between the stowed position B1 and the deployed position B4. As discussed in more detail herein, the motor 300 may be configured to move the powered side mirror 118 in a predetermined pattern based on at least one of position and a speed in response to the one or more sensors 112 detecting an unauthorized event around the vehicle 100.

For example, the predetermined pattern, when based on position, may include the powered side mirror 118 incrementally moving toward the deployed position B4 the longer the unauthorized event is detected or within a predetermined proximity of the vehicle 100. Specifically, the powered side mirror 118 may initially move to the first intermediate position B2 from the stowed position B1 for a first predetermined period of time, subsequently move to the second intermediate position B3 from the first intermediate position B2 for a second predetermined period of time, and subsequently move to the deployed position B4 for a third predetermined period of time. In embodiments, the powered side mirror 118 may remain in the deployed position B4 until it is determined that the unauthorized event is no longer detected or within the predetermined proximity of the vehicle 100.

As another example, the predetermined pattern, when based on position, may include the powered side mirror 118 incrementally moving toward the stowed position B1 the longer the unauthorized event is detected or within a predetermined proximity of the vehicle 100. Specifically, the powered side mirror 118 may initially move to the second intermediate position B3 from the deployed position B4 for a first predetermined period of time, subsequently move to the first intermediate position B2 from the second intermediate position B3 for a second predetermined period of time, and subsequently move to the stowed position B1 for a third predetermined period of time. In embodiments, the powered side mirror 118 may remain in the stowed position B1 until it is determined that the unauthorized event is no longer detected or within the predetermined proximity of the vehicle 100.

As another example, the predetermined pattern, when based on position, may include the powered side mirror 118 moving toward the deployed position B4 relative to a detected distance from an object detected within the unauthorized event, e.g., an unauthorized person approaching the vehicle 100. Specifically, the powered side mirror 118 may initially move to the first intermediate position B2 from the stowed position B1 when the unauthorized person is within a first predetermined distance of the vehicle 100, subsequently move to the second intermediate position B3 from the first intermediate position B2 when the unauthorized person is within a second predetermined distance of the vehicle 100 less than the first predetermined distance, and subsequently move to the deployed position B4 when the unauthorized person is within a third predetermined distance of the vehicle 100 less than the second predetermined distance. In embodiments, the powered side mirror 118 may move in the reverse order as the distance between the unauthorized person and the vehicle 100 increases, e.g., when the unauthorized person moves away from the vehicle 100.

As another example, the predetermined pattern, when based on position, may include the powered side mirror 118 repeatedly moving between two positions, such as the first intermediate position B2 and the second intermediate position B3. The provides a "shake" or "vibrate" effect across a reduced range of motion of the powered side mirror 118 as compared to the range of motion provided between the stowed position B1 and the deployed position B4.

As another example, the predetermined pattern, when based on position, may include the powered side mirror 118 moving in a "stairstepper" pattern. As referred to herein, the "stairstepper" pattern refers to the powered side mirror 118 alternating between moving in a direction toward the deployed position B4 and in a direction toward the stowed position B1, but eventually reaching the deployed position B4. For example, the powered side mirror 118 may move to the first intermediate position B2, back to the stowed position B1, to the second intermediate position B3, back to the first intermediate position B2, and finally to the deployed position B4. Alternatively, the powered side mirror 118 may move in the reverse direction to eventually reach the stowed position B1.

As another example, the predetermined pattern, when based on speed, may include the powered side mirror 118 moving into the stowed position B1 from the deployed position B4 at a first speed, and back into the deployed position B4 from the stowed position B1 at a second speed different from the first speed. In embodiments, the second speed is greater than the first speed. In other embodiments, the second speed is less than the first speed.

As another example, the predetermined pattern, when based on speed, may include the powered side mirror 118 moving between the stowed position B1 and the deployed position B4 a predetermined number of times at a first speed and, subsequently, a predetermined number of times at a second speed. In embodiments, the second speed is greater than the first speed. In other embodiments, the second speed is less than the first speed. It should be appreciated that, in embodiments, the first speed and the second speed, and/or the predetermined number of times the powered side mirror 118 moves at the first speed and the second speed, may be dependent on the particular conditions of the unauthorized event. Specifically, as a non-limiting example, the speed at which the powered side mirror 118 moves between the stowed position B1 and the deployed position B4 may increase in response to a distance between the vehicle 100 and an object of the unauthorized event decreasing.

It should be appreciated that the examples of the predetermined pattern for which the powered side mirror 118 moves and the speed at which the powered side mirror 118 moves is not limited to the specific examples provided herein. As such, other examples not discussed in detail herein are contemplated as being within the scope of the present disclosure.

Figure 4:
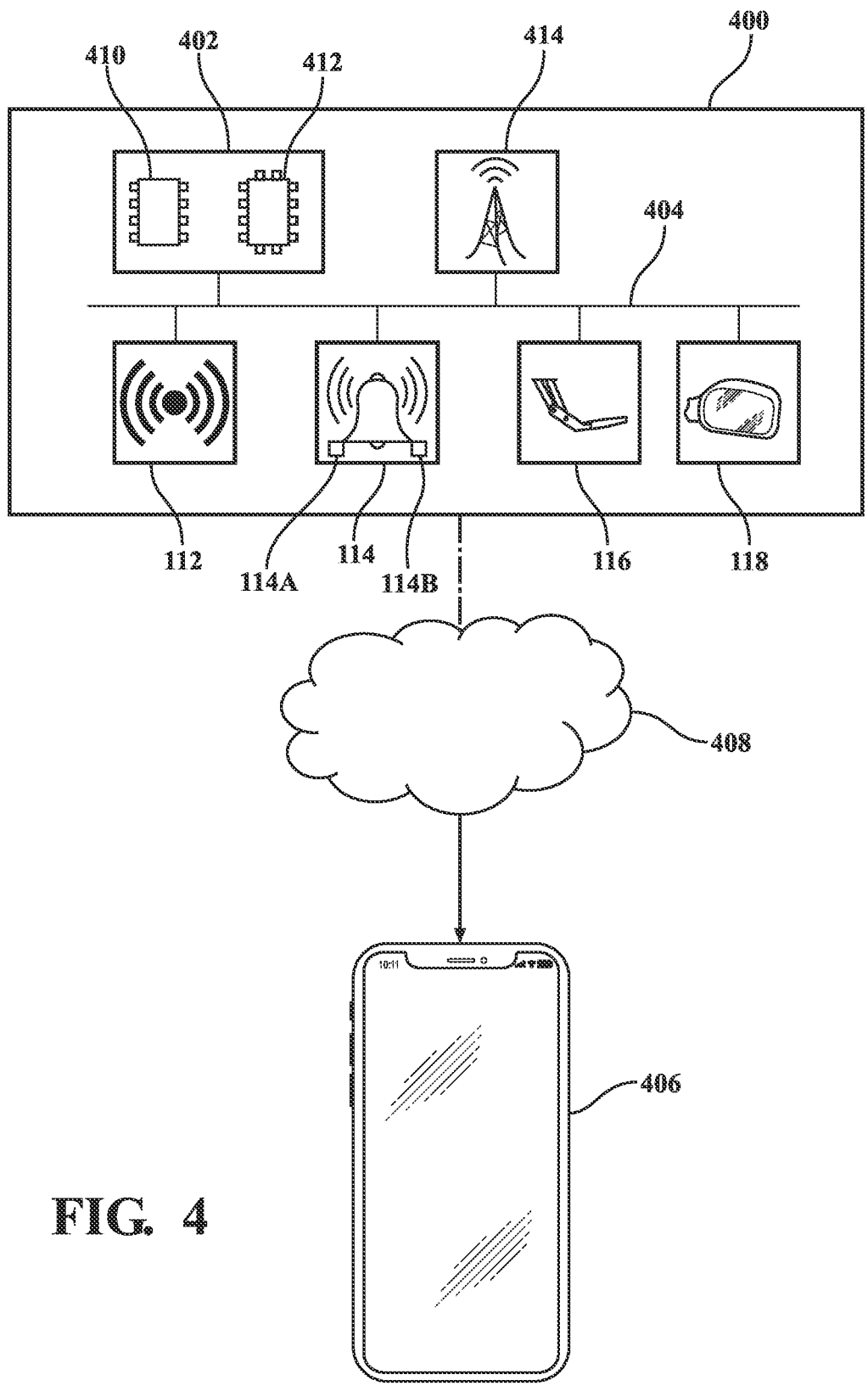
FIG. 4 schematically depicts a vehicle system of the vehicle of FIG. 1, according to one or more embodiments shown and described herein.

Referring now to FIG. 4, components of a vehicle system 400 are schematically depicted. In embodiments, the vehicle system 400 includes a controller 402, such as an electronic control unit, a communication path 404, the one or more sensors 112, the alarm device 114, the powered running board 116, and the powered side mirror 118. However, it should be noted that, in embodiments, the vehicle system 400 may not include each of the various components discussed herein.

In embodiments, the vehicle system 400 may communicate with a mobile device 406, such as a smart phone or the like, via a network 408. As such, information pertaining to the unauthorized event around the vehicle 100 may be provided on a display screen of the mobile device 406. In addition, the alarm device 114 may be remotely controlled, such as to deactivate the alarm device 114, by operating the mobile device 406 and sending instruction to the vehicle system 400 via the network 408.

As noted above, the vehicle system 400 includes the communication path 404. The communication path 404 may be formed from any medium that is capable of transmitting a signal such as, for example, conductive wires, conductive traces, optical waveguides, or the like. Moreover, the communication path 404 may be formed from a combination of mediums capable of transmitting signals. In one embodiment, the communication path 404 includes a combination of conductive traces, conductive wires, connectors, and buses that cooperate to permit the transmission of electrical data signals to components such as processors, memories, sensors, input devices, output devices, and communication devices. Accordingly, the communication path 404 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 404 communicatively couples the various components of the vehicle system 400. As used herein, the term "communicatively coupled" means that coupled components are capable of exchanging data signals with one another such as, for example, electrical signals via conductive medium, electromagnetic signals via air, optical signals via optical waveguides, and the like.

As noted above, the vehicle system 400 includes the controller 402 including one or more processors 410 and one or more memory modules 412. Each of the one or more processors 410 may be any device capable of executing machine readable instructions. Accordingly, each of the one or more processors 410 may be an integrated circuit, a microchip, a computer, or any other computing device. The one or more processors 410 are communicatively coupled to the other components of the vehicle system 400 by the communication path 404. Accordingly, the communication path 404 may communicatively couple any number of processors with one another, and allow the modules coupled to the communication path 404 to operate in a distributed computing environment. Specifically, each of the modules may operate as a node that may send and/or receive data.

Each of the one or more memory modules 412 of the vehicle system 400 is coupled to the communication path 404 and communicatively coupled to the one or more processors 410. The one or more memory modules 412 may include RAM, ROM, flash memories, hard drives, or any device capable of storing machine readable instructions such that the machine readable instructions may be accessed and executed by the one or more processors 410. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 412. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The vehicle system 400 includes network interface hardware 414 for communicatively coupling the vehicle system 400 to the mobile device 406 via the network 408. The network interface hardware 414 can be communicatively coupled to the communication path 404 and can be any device capable of transmitting and/or receiving data via the network 408. Accordingly, the network interface hardware 414 can include a communication transceiver for sending and/or receiving any wired or wireless communication. For example, the network interface hardware 414 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 414 includes hardware configured to operate in accordance with the Bluetooth® wireless communication protocol.

Figure 5:
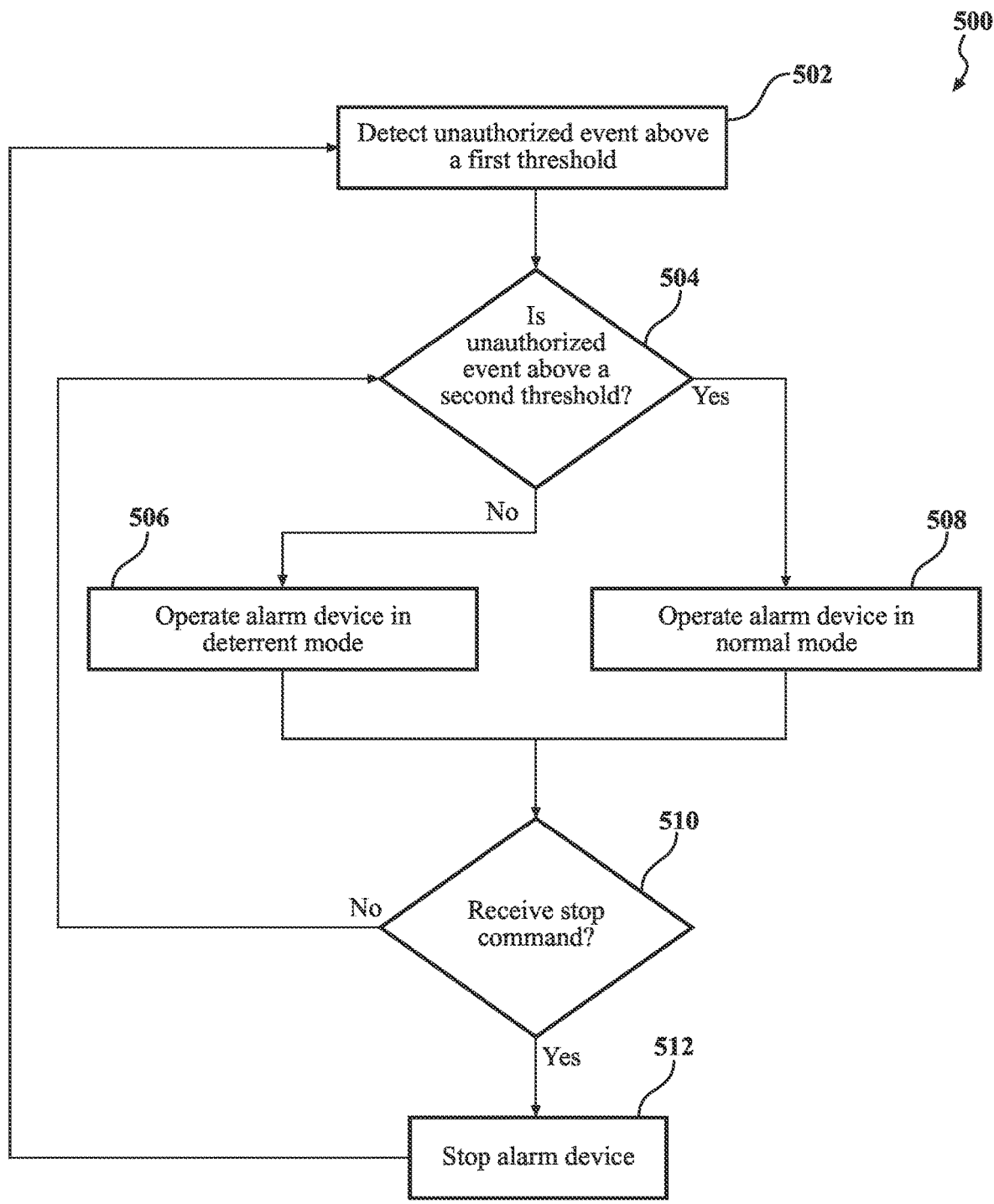
FIG. 5 depicts a flowchart of a method for activating an alarm device of the vehicle of FIG. 1, according to one or more embodiments shown and described herein.

The alarm device 114 may include or be configured to control any number of vehicle components to be activated during an alarm event such as, for example, a horn, lights, a display device, and the like, as well as the motor 206 of the powered running board 116 and the motor 300 of the powered side mirror 118. As such, the alarm device 114 may include an audio output unit 114A configured to output audio, such as the horn, and/or a visual output unit 114B configured to output a visual output, such as the lights or a display device. As discussed herein, the alarm device 114 may be operated in a deterrent mode and a normal mode based on the unauthorized event being determined to be a first level unauthorized event or a second level unauthorized event, respectively. In the deterrent mode, the alarm device 114 is operated performs a first set of alarm actions. In the normal mode, the alarm device 114 is operated to perform a second set of alarm actions different from the first set of alarm actions. For example, the first set of alarm actions may include the powered running board 116 and/or the powered side mirror 118 operating in accordance with the predetermined pattern discussed herein. The second set of alarm actions may include the addition of other actions by, for example, the horn, lights, or the like. The second set of alarm conditions may also include the discontinuation of the powered running board 116 and/or the powered side mirror 118 operating in accordance with the predetermined pattern. Alternatively, the second set of alarm actions may include the powered running board 116 and/or the powered side mirror 118 operating in accordance with a predetermined pattern different from the predetermined pattern utilized during the first set of alarm actions. In other embodiments, the predetermined pattern utilized during the second set of alarm actions may be the same as the predetermined pattern utilized during the first set of alarm actions Referring now to FIG. 5, a flowchart is depicted indicating a method 500 for operating the alarm device 114 in response to the controller 402 detecting an unauthorized event and operating the powered running board 116 and/or the powered side mirror 118 accordingly, as discussed herein. At step 502, the sensors 112 capture data of activity around the vehicle 100 and the controller 402 processes the data to determine whether an unauthorized event has been detected above a first threshold, e.g., a first level unauthorized event or a second level unauthorized event. As referred to herein, the first threshold may be measured by a distance to an unauthorized person and/or object, an amount of force applied against the vehicle 100, and the like. It should be appreciated that when the unauthorized event is not above the first threshold, the method 500 does not proceed any further and the alarm device 114 does not operate in either the deterrent mode or the normal mode. However, if the unauthorized event is above the first threshold, the method 500 proceeds to step 502. At step 502, a determination is made by the controller 402 as to whether the unauthorized event exceeds a second threshold greater than the first threshold so as to be classified as a second level unauthorized event. For example, the second threshold may be satisfied when a distance to the unauthorized person and/or object is within a predetermined distance to the vehicle 100, or an amount of force applied against the vehicle 100 exceeds a predetermined threshold. Other non-limiting examples of first level unauthorized events and second level unauthorized events are described in greater detail herein.

When it is determined at step 504 that the unauthorized event does not exceed the second threshold, e.g., the unauthorized event is a first level unauthorized event, the method 500 proceeds to step 506. Accordingly, at step 506, the alarm device 114 operates in the deterrent mode and controls the vehicle components in accordance with the first set of alarm actions. As discussed herein, the first set of alarm actions includes, but is not limited to, the powered running board 116 and/or the powered side mirror 118 operating in accordance with a predetermined pattern.

Alternatively, if it is determined at step 504 that the unauthorized event does exceed the second threshold, e.g., the unauthorized event is a second level unauthorized event, the method 500 proceeds to step 508. Accordingly, at step 508, the alarm device 114 operates in the normal mode and controls the vehicle components in accordance with the second set of alarm actions. As discussed herein, the second set of alarm actions includes, but is not limited to, the horn, the lights, and other components of the vehicle 100, and may further include the powered running board 116 and/or the powered side mirror 118 operating in accordance with a predetermined pattern. The predetermined pattern may be the same or different from the predetermined pattern during the first set of alarm actions. As such, it should be appreciated that, when in the normal mode, the powered running board 116 and/or the powered side mirror 118 may still be operated in accordance with the same or a different predetermined pattern as exhibited when operating in the deterrent mode. However, one or more other vehicle components are activated by the alarm device 114 as well during the normal mode to provide a different set of alarm actions.

After the alarm device 114 is operated in either the deterrent mode or the normal mode, the method 500 proceeds to step 510 at which the vehicle system 400, specifically the controller 402, determines whether a stop command has been received. In embodiments, the stop command may be sent from the mobile device 406. In other embodiments, the stop command may be received and detected by the controller 402 automatically in response to the alarm device 114 operating in excess of a predetermined period of time. If it is determined that the stop command has not been received, the method 500 returns to step 504 to continue determining whether the unauthorized event is above the second threshold. This allows the alarm device 114 to transition from operating in the deterrent mode to the normal mode in response to determining that the unauthorized event is now a second level unauthorized event or, alternatively, transition to the deterrent mode from the normal mode in response to determining that the unauthorized event is now a first level unauthorized event. Alternatively, if it is determined by the controller 402 that the stop command is received at step 510, the method 500 proceeds to step 512 at which the controller 402 instructs the vehicle components, such as the powered running board 116 and/or the powered side mirror 118, to stop operating. The method 500 then returns to step 502 to continue monitoring for an unauthorized event.

From the above, it is to be appreciated that defined herein is a vehicle including an alarm device configured to operate a vehicle component, such as a powered running powered and/or a powered side mirror, in a predetermined pattern based on at least one of position and speed in response to detecting an unauthorized event.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a powered running board;
a motor for positioning the powered running board between a stowed position and a deployed position;
a sensor configured to capture data of activity around the vehicle; and
an electronic control unit configured to:
process the data captured by the sensor to detect an unauthorized event around the vehicle; and
operate the motor to repeatedly move the powered running board in a predetermined pattern of at least one of position and a speed of the running board in response to detecting an unauthorized event around the vehicle.

2. The vehicle of claim 1, wherein the electronic control unit is configured to:
operate an alarm device of the vehicle in a deterrent mode in response to determining that the unauthorized event exceeds a first threshold; and
operate the alarm device of the vehicle in a normal mode in response to determining that the unauthorized event exceeds a second threshold.

3. The vehicle of claim 2, wherein operating the alarm device in the deterrent mode includes performing a first set of alarm actions, the first set of alarm actions including operating the motor in the predetermined pattern.

4. The vehicle of claim 3, wherein operating the alarm device in the normal mode includes performing a second set of alarm actions, the second set of alarm actions being different from the first set of alarm actions.

5. The vehicle of claim 4, wherein the second set of alarm actions includes activating at least one of a horn of the vehicle and a plurality of lights of the vehicle.

6. The vehicle of claim 1, wherein, when the predetermined pattern is based on speed, the electronic control unit is configured to:
operate the motor to move the powered running board to the stowed position at a first speed;
subsequently operate the motor to move the powered running board to the deployed position at a second speed greater than the first speed; and repeat the steps of operating the motor to move the powered running board between the stowed position at the first speed and the deployed position at the second speed a plurality of times.

7. The vehicle of claim 1, wherein, when the predetermined pattern is based on position, the electronic control unit is configured to:
repeatedly operate the motor to move the powered running board between a first intermediate position and a second intermediate position between the stowed position and the deployed position.

8. An electronic control unit of a vehicle configured to:
process data captured by a sensor to detect an unauthorized event around the vehicle; and
operate a motor of the vehicle to repeatedly move a powered running board of the vehicle in a predetermined pattern of at least one of position and speed of the running board in response to detecting the unauthorized event around the vehicle.

9. The electronic control unit of claim 8, wherein the electronic control unit is configured to:
send a first signal to operate an alarm device of the vehicle in a deterrent mode in response to determining that the unauthorized event exceeds a first threshold; and
send a second signal to operate the alarm device of the vehicle in a normal mode in response to determining that the unauthorized event exceeds a second threshold.

10. The electronic control unit of claim 9, wherein the first signal includes instruction to operate the alarm device in the deterrent mode to perform a first set of alarm actions, the first set of alarm actions including operating the motor in the predetermined pattern.

11. The electronic control unit of claim 10, wherein the second signal includes instruction to operate the alarm device in the normal mode to perform a second set of alarm actions, the second set of alarm actions being different from the first set of alarm actions.

12. The electronic control unit of claim 11, wherein the second set of alarm actions includes activation of at least one of a horn of the vehicle and a plurality of lights of the vehicle.

13. The electronic control unit of claim 8, wherein, when the predetermined pattern is based on speed, the electronic control unit is configured to:
operate the motor to move the powered running board to a stowed position at a first speed;
subsequently operate the motor to move the powered running board to a deployed position at a second speed greater than the first speed; and
repeat the steps of operating the motor to move the powered running board between the stowed position at the first speed and the deployed position at the second speed a plurality of times.

14. The electronic control unit of claim 8, wherein, when the predetermined pattern is based on position, the electronic control unit is configured to:
repeatedly operate the motor to move the powered running board between a first intermediate position and a second intermediate position between a stowed position and a deployed position.

15. A method comprising:
detecting an unauthorized event around a vehicle; and
in response to detecting the unauthorized event around the vehicle, operating a motor to repeatedly move a powered running board in a predetermined pattern of at least one of position and a speed of the running board.

16. The method of claim 15, further comprising:
operating an alarm device of the vehicle in a deterrent mode in response to determining that the unauthorized event exceeds a first threshold; and
operating the alarm device of the vehicle in a normal mode in response to determining that the unauthorized event exceeds a second threshold.

17. The method of claim 16, wherein operating the alarm device in the deterrent mode includes performing a first set of alarm actions, the first set of alarm actions including operating the motor in the predetermined pattern.

18. The method of claim 17, wherein operating the alarm device in the normal mode includes performing a second set of alarm actions, the second set of alarm actions being different from the first set of alarm actions.

19. The method of claim 15, wherein, when the predetermined pattern is based on speed, further comprising:
operating the motor to move the powered running board to a stowed position at a first speed;
subsequently operating the motor to move the powered running board to a deployed position at a second speed greater than the first speed; and
repeating the steps of operating the motor to move the powered running board between the stowed position at the first speed and the deployed position at the second speed a plurality of times.

20. The method of claim 15, wherein, when the predetermined pattern is based on position, further comprising:
repeatedly operating the motor to move the powered running board between a first intermediate position and a second intermediate position between a stowed position and a deployed position.

* * * * *